United States Patent [19]
Costlow et al.

[11] Patent Number: 5,517,740
[45] Date of Patent: May 21, 1996

[54] PNEUMATIC TOOL AND METHOD FOR PLUG REMOVAL

[75] Inventors: Annette M. Costlow, Trafford; James J. Roberts, Irwin; Paul J. Boone, Bethel Park; Randall A. Holmes, Delmont, all of Pa.

[73] Assignee: Westinghouse Electric Corporation, Pittsburgh, Pa.

[21] Appl. No.: 203,632

[22] Filed: Feb. 28, 1994

[51] Int. Cl.⁶ ........................................ B23P 19/04
[52] U.S. Cl. .......................... 29/254; 81/3.2; 173/17
[58] Field of Search ................. 29/252, 254; 173/17; 81/3.2

[56] References Cited

U.S. PATENT DOCUMENTS

| | | |
|---|---|---|
| 3,120,700 | 2/1964 | Chuplis, Jr. . |
| 3,613,212 | 10/1971 | Miller . |
| 4,390,042 | 6/1983 | Kucherer . |
| 4,734,972 | 4/1988 | Hawkins . |
| 4,800,637 | 1/1989 | Overbay . |
| 4,829,660 | 5/1989 | Everett et al. . |
| 4,903,392 | 2/1990 | Stickel et al. . |
| 5,210,918 | 5/1993 | Wozniak et al. ............... 29/254 |
| 5,317,793 | 6/1994 | Boyd et al. .................... 29/252 |
| 5,329,685 | 7/1994 | Gillespie ....................... 29/254 |
| 5,333,377 | 8/1994 | Phillips ...................... 29/252 X |

Primary Examiner—Joseph M. Gorski

[57] ABSTRACT

A tool for removing a metal plug from a tube with repeated pulling impulses includes a pneumatic cylinder defining an interior, cylindrical chamber. A distal end surface of the cylinder defines an anvil. A cylindrical slug, or hammer, is sealingly slidable within the chamber in response to a pressure difference above and below the hammer within the chamber. The cylinder is rigidly connected to the plug so as to hang therefrom, the weight of the cylinder providing a static pull force working in conjunction with the pulling impulses. A pulling impulse is provided by first raising the hammer above the anvil by pneumatically creating a first pressure difference wherein the pressure below the hammer is greater than the pressure above the hammer, then creating a second pressure difference wherein the pressure below the hammer is no greater than the pressure above the hammer in order to drive the hammer against the anvil at speed. The tool is also adapted for disengaging an expander member engaged in a tapered plug shell with a mandrel that includes a push-rod having an end extending into the top of the chamber proximate the plug. Repeated displacement impulses are applied to the expander member by applying a different sequence of forces to the hammer so as to cause it to repeatedly strike the push-rod against the expander member. The tool and a method of using the tool are particularly suited to removing a plug from a heat exchanger tube in a nuclear powered steam generator.

4 Claims, 5 Drawing Sheets

PNEUMATIC TOOL AND METHOD FOR PLUG REMOVAL

CROSS REFERENCE TO RELATED APPLICATION

The following application filed on even date relates to a method and tool for removing a metalic plug from a tube: Ser. No. 08/203,631, entitled METHOD AND TOOL FOR REMOVING A METALIC PLUG FROM A TUBE, by David J. Fink, James W. Everett, Paul Boone, Annette M. Costlow and James J. Roberts, now U.S. Pat. No. 5,465,483.

BACKGROUND OF THE INVENTION

1. Field of the Invention

This invention relates to tools for removing a plug from a conduit, and, more particularly, to a pneumatic tool for removal of a plug from a heat exchanger tube mounted in a tube sheet of a nuclear powered steam generator by simultaneously applying a static pull force and a repetitive impulse to the plug.

2. Description of the Prior Art

Damaged or corroded heat exchanger tubes in nuclear powered steam generators have, in the past, been removed from service by plugging them with metallic plugs. Recent technological advances have made it possible to refurbish some marginally corroded or damaged tubes to put them back in service, thereby increasing the power producing capacity of the steam generator. Therefore it is desirable to be able to remove a plug, inspect the tube from which it is removed, and refurbish the tube or replug it depending upon the outcome of the inspection.

The plugs typically used for plugging heat exchanger tubes in nuclear powered steam generators are formed from a tubular shell fabricated of a nickel alloy, such as, Inconel®. The shell is open at an end near an open end of the conduit, or tube, near a face of a tube sheet in the steam generator, and closed at its opposite end distal from the tube opening. One common type of plug, described in commonly owned U.S. Pat. No. 4,390,042, to Kucherer, includes an internally threaded plug skirt at the open end and a tapered, cork-shaped expander member contained completely in the interior of the shell. Before fixing the plug to the tube, the larger, circular end of the expander member is in abutment with the inner surface of the closed end of the plug shell. The shell inner surface is slightly tapered from the closed end to an axial position near the threaded plug skirt. When the cork-shaped expander member is forcefully drawn from the closed end towards the open end of the shell by a hydraulic ram, it radially expands the plug into sealing engagement with the interior surface of the tube by a wedging action. The forceful pulling of the cork-shaped expander member along the longitudinal axis of the shell further applies an extruding force to the metallic walls of the shell. A plurality of annular lands circumscribing the outer walls of the shell become sealingly engaged against the interior surface of the heat exchanger tube.

The traditional method for removing mechanical plugs, such as the plug described above, includes the steps of first pushing back the internal expander with a push-rod, and then pulling the plug with a hydraulic puller. Typically, the threads of the plug skirt are used for attachment of the puller to the plug. This method of pushing the expander back and pulling has severe problems. First, and most limiting, is that the bottom of the plug (the plug skirt) often breaks off before the plug dislodges. This is particularly undesirable since the only remaining recovery method, drilling, is now made difficult by a loose expander. When a plug is pulled successfully, the inner surface of the tube is often deeply scored by the pulling process. This scoring usually dictates a reaming process if the tube is to be replugged at a later date and may be severe enough to prevent a tube from being put back in service.

Another method for removing such plugs is described in commonly owned U.S. Pat. No. 4,903,392, to Stickel, et al. According to this method, the plug is heated with an electrically conductive push-rod by ohmic heating to a temperature that lowers its tensile yield strength, and an axial force is applied to the plug to elongate it, thereby radially contracting the plug and relaxing the engagement between the plug and the inner surface of the tube. After cooling, the plug may then be pulled out of the tube. This heat relaxation method requires a complex tooling system and also has some severe limitations. The plug shell can tear, or separate, during the step of pushing back the expander or elongating the plug shell. In this event, the tube will most likely need to be reamed and replugged. U.S. Pat. No. 4,800,637, to Overbay, also describes a method by which the plug shell is mechanically elongated, but without the heating step.

Another method for removing such plugs from heat exchanger tubes is disclosed in commonly owned U.S. Pat. No. 4,829,660, to Everett et al. The expander element is pushed back out of engagement with the tapered inner surface of the plug and forced through the closed end of the plug shell. A TIG torch is then used to create beads along the longitudinal axis of the plug shell to relax the engagement between the shell and the tube. This method also requires a complex tooling system. Further, if the plug shell separates during the expander push-back, a TIG burn will be made in the tube wall, likely requiring reaming and replugging of the tube.

Plug drilling, such as disclosed in commonly owned U.S. Pat. No. 4,734,972, to Hawkins, is another method of plug removal but is usually undesirable because of the complexity of the process and the risk of damaging the tube sheet and the tubes. Drilling is also very slow and impractical for large numbers of plugs. Further, drilling can create activated debris in the steam generator that is difficult and hazardous to remove.

Alternative methods of plug removal have not been forthcoming because of the limitation of the breakage of the bottom of the plug and the difficulty in finding an alternate place to apply a removal force. Therefore, there is a need for a new method for removing plugs from heat exchanger tubes and similar conduits that does not suffer the disadvantages of the prior art methods.

SUMMARY OF THE INVENTION

These needs and others are satisfied with the present invention for a tool and method for removing a metallic plug that has been radially expanded into engagement with an inner surface of a conduit, or tube. According to the invention, the plug is removed with preferably repeated pulling impulses on the plug, preferably applied to the plug in conjunction with a static pull force.

The tool includes a pneumatic cylinder defining an interior, cylindrical chamber, a first end distal from the plug defining an anvil at a surface of the chamber distal from the plug, and a cylindrical slug, or hammer, sealingly slidable within the chamber in response to a pressure difference between a hammer surface proximal the plug and a hammer surface distal the plug. (Throughout the remainder of this specification, the terms "distal" and "proximal" shall be defined in relation to the plug unless otherwise specified.) The cylinder is rigidly connected to the plug by a mandrel that is preferably fabricated from a solid member. A pulling impulse is provided by first moving the hammer away from the anvil by pneumatically creating a pressure difference in the chamber between the proximal end of the chamber on a proximal side of the hammer and the distal end of the chamber on a distal side of the hammer, then quickly venting the pressure in the distal end of the chamber while maintaining a positive pressure in the proximal end to allow the hammer to strike against the anvil at speed. The tool and the method of using the tool are particularly suited for and easily adapted to removing a plug from a heat exchanger tube in a nuclear powered steam generator.

According to another aspect of the invention, the cylinder is oriented so as to hang from the plug by the mandrel, the weight of the cylinder and any components supported by the cylinder providing the static pull force.

According to another aspect of the invention, a pneumatic system connected to the top and bottom ends of the chamber provide controlled pressure to the proximal end and to the distal end of the chamber, respectively. The pressure to each of the proximal and distal ends is preferably independently sourced and controlled by first and second pneumatic systems, respectively. The tool can also include a distal vent system for venting the distal end of the chamber. To create a pulling impulse, the hammer is first moved away from the anvil by the steps of closing the vent, and then providing positive pressure with each of the pneumatic systems so as to apply a greater force to the distal side of the hammer than to the proximal side of the hammer. Then, by opening the vent to quickly release the positive pressure in the distal end of the chamber, the force on the distal side of the hammer is rapidly reduced to a magnitude that is less than the magnitude of the force applied to the proximal side of the hammer. The positive pressure in the proximal end of the chamber, preferably acting in conjunction with gravity, applies a force moving the hammer against the anvil at speed. The plug can be removed by applying repeated pulling impulses.

According to another aspect of the invention, a position feedback system, capable of sensing movement of the plug due to a first pulling impulse, can adjust the magnitude of a subsequent pulling impulse based upon the magnitude of movement of the plug due to the first pulling impulse. The position feedback system can also be used for determining when the plug is removed from the tube and for stopping the impulses is response to a predetermined condition, for example, if the plug is removed, or if the plug does not move after applying repeated pulling impulses.

According to another aspect of the invention, the tool is adapted for displacing an expander member in a metalic plug, such as that described in U.S. Pat. No 4,390,042 and discussed hereinbefore, prior to removing the plug, by applying a displacement impulse to the expander member. Repeated displacement impulses can be applied if a first impulse does not displace the plug. A push-back mandrel rigidly connects the cylinder and the plug, a distal end of the push-back mandrel connecting to the proximal end of the cylinder. An elongated push-rod is slidable a predetermined distance within an axially extending bore of the push-back mandrel, and extends beyond the proximal and distal ends thereof. The proximal end of the push-rod is adapted for pushing on the expander member.

Before starting to displace an expander member, the push-rod is positioned distal from the plug such that the distal end of the push-rod extends through an axial hole in the cylinder into the proximal end of the chamber, and a proximal end of the push-rod can abut the expander member. Applying the displacement impulse includes several steps. First, the pressure control means applies positive pneumatic pressure to each end of the chamber. The pressure applied to the distal end of the chamber is preferably 15–30 psi greater than the pressure applied to the proximal end of the chamber. The distal end of the chamber is then vented by opening the distal vent. The pressure on the proximal surface of the hammer, which is preferably minimal for this purpose, thereby moves the hammer towards the anvil. A pressure difference between the ends of the chamber is quickly created by closing the distal vent and then quickly venting the proximal end of the chamber with a proximal vent provided for that purpose, thereby applying a net force on the hammer moving it towards the proximal end of the chamber so as to strike the distal end of the push-rod at speed, and thereby transfering the displacement impulse to the expander member. To apply a repeated displacement impulse, the proximal vent is closed and the distal vent opened to move the hammer to the distal end of the chamber, and the steps of closing the distal vent and then quickly opening the proximal vent are repeated.

An object of this invention is to provide a method and tool for removing a plug from a conduit, or tube, that reduces the likelihood of scoring the conduit during the removal process.

Another object of this invention is to provide a method and tool for removing a plug, formed by a plug shell having a threaded plug skirt, from a conduit that reduces the likelihood of breaking off the plug skirt or tearing the plug shell during the removal process.

Another object of this invention is to provide a method and tool for removing a plug from a conduit that does not require that a high current be applied to the plug.

Another object of this invention is to provide a method and tool for removing a plug from a conduit that does not require that a high heat source be applied to the plug.

Another object of this invention is to provide a method and tool for removing a plug from a conduit wherein the static pulling force applied to the plug is significantly smaller than the force applied using prior art methods.

Another object of this invention is to provide a more reliable method and tool for removing a plug from a conduit, or tube, than provided by prior art methods.

Another object of this invention is to provide a method and tool for removing a plug from a heat exchanger tube in a nuclear powered steam generator that creates less debris than prior art methods.

Another object of this invention is to provide a method and a tool that are especially suitable for removing a plug used to plug a heat exchanger tube of a nuclear powered steam generator.

These and other objects of the present invention will be more fully understood from the following description of the invention with reference to the illustrations appended hereto.

DESCRIPTION OF THE PREFERRED EMBODIMENTS

Figure 1:
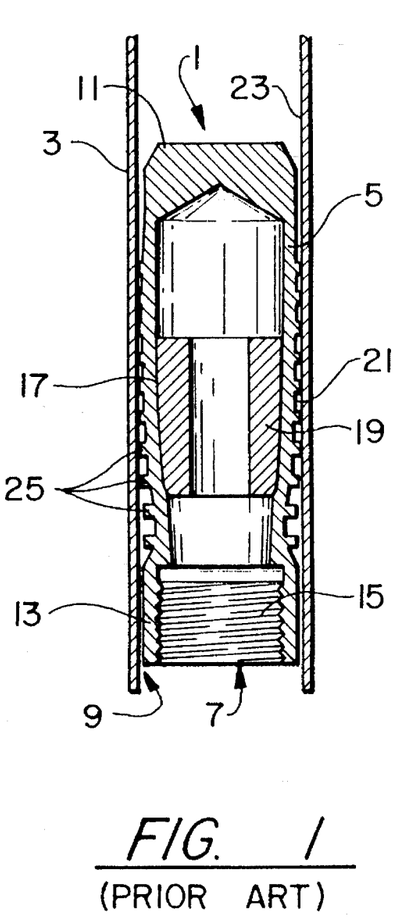
FIG. 1 is a longitudinal section of a plug lodged in a tube, wherein an expander member is engaged with a tapered inner surface of the plug shell.
Figure 2:
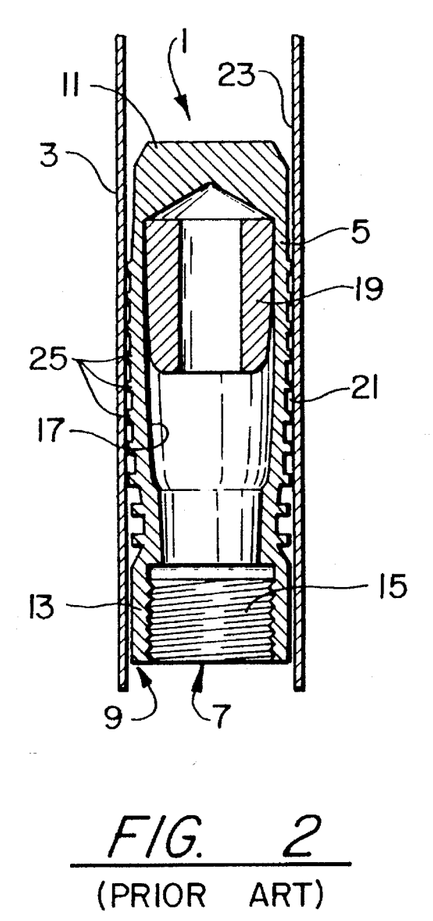
FIG. 2 is a similar view of the plug of FIG. 1, wherein the expander member is pushed back out of engagement with the tapered inner surface of the plug shell.

Referring now to the figures, and in particular to FIGS. 1 and 2, a plug 1 of the type commonly used to seal a heat exchanger tube in a nuclear powered steam generator is illustrated in cross section within such tube 3. Plug 1 is formed of a generally cylindrical, hollow, plug shell 5 about ¾-7/8 inch (1.91–2.22 cm) in diameter and a few inches long. Plug shell 5 is made of a nickel alloy, such as Inconel®, as is heat exchanger tube 3. An open end 7 of plug shell 5 is near the opening 9 of heat exchanger tube 3, and a closed end 11 is distal from opening 9. A plug skirt 13 at open end 7 is tapped with threads 15 so that a pulling tool (not shown) with mating threads can be attached for gripping plug shell 5. An inner surface 17 of plug shell 5 is tapered down towards plug skirt 13. An expander member 19 inside plug shell 5 is also tapered towards plug skirt 13 for engaging tapered inner surface 17 when pulled down by a ram.

FIG. 1 shows the plug 1 with expander member 19 in the engaged position with tapered inner surface 17 of plug shell 5. As expander member 19 is pulled down into tapered inner surface 17, wall 21 of plug shell 5 is expanded radially outward and engages inner surface 23 of tube 3. Annular lands 25 formed on outer wall 21 provide a secure seal. FIG. 2 shows plug 1 after expander member 19 has been pushed back out of engagement with tapered inner surface 17 by, for example, a push-rod (not shown).

Figure 3A:
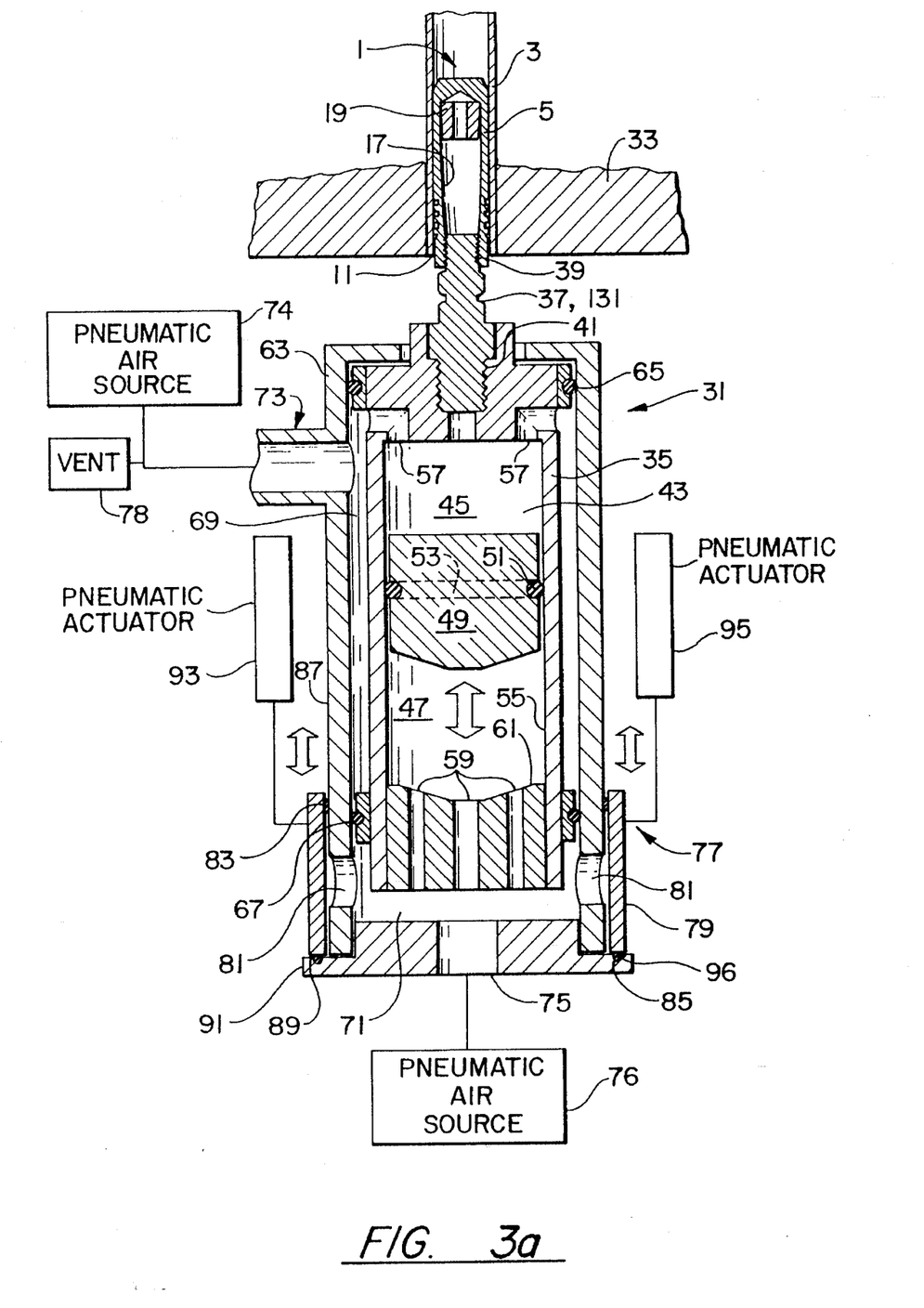
FIGS. 3a and 3b are longitudinal section views of a plug removal tool of this invention with, respectively, a puller mandrel and a push-back mandrel attaching the pneumatic cylinder to a plug.
Figure 3B:
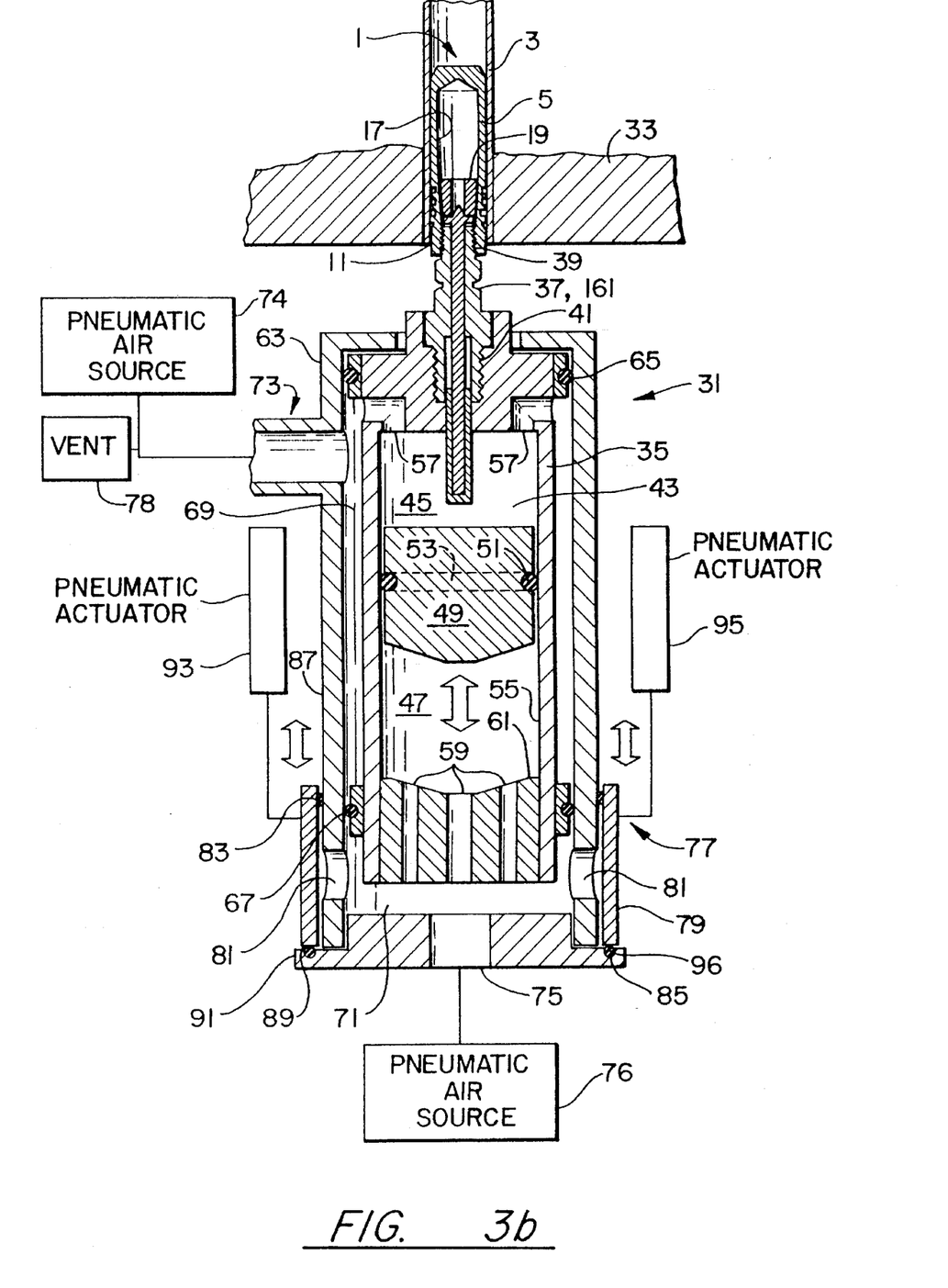

Referring now also to FIGS. 3a and 3b, a tool 31 of this invention for extracting heat exchanger plug 1 is schematically illustrated in longitudinal cross section. Similar structures common to each figure will be referenced by the same reference numbers throughout this specification for simplicity of exposition. Heat exchanger tube 3 is shown emplaced within a tube sheet 33 of a heat exchanger (not shown). Tool 31, which can have a high degree of structural symmetry about a cylindrical axis aligned with the longitudinal axes of tube 3 and plug 1 as illustrated in the figure, utilizes the weight of pneumatic cylinder 35 and a second cylinder 63 to provide a static pull force to the plug 1. Experience has shown that using an axial pull force alone to pull plugs will often exceed the tensile strength of plug skirt 11, causing plug skirt 11 to break off. This invention permits use of a smaller static pull force than prior art methods of plug removal, thus avoiding the skirt breakage problem.

The tool 31 is adapted for applying repeated pulling impulses to the plug 1 to extract plug 1, and is also adapted for applying repeated displacement impulses to the expander member 19 to disengage it from the tapered inner surface 17 of plug shell 5. The tool 31 transmits the static force and each type of impulse directly through solid members. This is necessary in order to achieve the full effect of the impulses.

The tool 31 is connected to the plug 1 with a mandrel, referred to hereinafter generically by reference character 37. Mandrel 37 can be adapted for applying pulling impulses or for applying displacement impulses. Tool 31 illustrated in FIG. 3a transfers the static pull force and pulling impulses to plug shell 5 via a puller mandrel 131 that preferably engages threads 15 of plug skirt 13 with mating threads 39 at a proximal end. The other, distal end of mandrel 37 is rigidly connected to the pneumatic cylinder 35, for example, by screw threads 41 screwed into tapped threads 113 in the proximal end of the cylinder 41. FIG. 3b illustrates a tool 31 adapted for displacing an expander member 19 using a push-back mandrel 161 similarly connecting the cylinder 35 to the plug 1. A push-rod 165 transfers displacement impulses to the expander member 19.

Pneumatic cylinder 35 includes a cylindrical internal chamber 43 that is divided into a proximal end 45 and a distal end 47 by a generally cylindrical slug, or hammer 49 sealingly slideable within the chamber 43 in response to a pressure differential between the proximal end 45 of the chamber and the distal end 47 of the chamber. A lubricated o-ring 51 seated in o-ring groove 53 provides a slidable seal between the hammer 49 and the cylindrical surface 55 of the chamber 43. O-ring 51 is preferably lubricated with a non-fluid lubricant, such as 10W-NR lubricant. Proximate pneumatic channels 57 and distal pneumatic channels 59 are provided for pressurizing and depressurizing the proximal end 45 of the chamber and the distal end 47 of the chamber, respectively. A distal surface of the chamber 43 defines an anvil 61 for absorbing impacts from the hammer 49.

Substantially surrounding the pneumatic cylinder 35 is the second cylinder 63 which can preferably be carried by a free end of a robotic arm (not shown) having a base plate at a fixed end secured to the tubesheet 33. The second cylinder 63 can move axially on seals located between the pneumatic cylinder 35 and the second cylinder 63. The seals are preferably provided by a proximal o-ring 65 and a distal o-ring 67 that cooperatively define a proximal plenum 69 and a distal plenum 71 between the two cylinders. Each o-ring is preferably lubricated. Channels 57 communicate between the proximal plenum 69 and the proximal end 45 of the chamber. Channels 59 communicate between the distal plenum 71 and the distal end 47 of the chamber. The second cylinder 63 also includes a proximal pneumatic connector 73 for connecting to a first source of pneumatic air 74 and a distal pneumatic connector 75 for connecting the distal plenum 71 to a second source of pneumatic air 76. The first source of pneumatic air preferably includes a proximal vent mechanism 78, preferably solenoid actuated, for quickly reducing pressure in the proximal plenum 69, and thereby also in the proximal end 45 of the chamber.

A shutter arrangement 77 is used for quickly reducing pressure, or venting, the distal plenum 71 and thereby also venting the distal end 47 of the chamber 43. The shutter arrangement 77 preferably includes an annular, moveable shutter 79 concentrically aligned outside the second cylinder 63. Near the distal of the second cylinder are a plurality of distal plenum vents 81 facing the shutter. The shutter 79 is moveable in a direction indicated by arrows between a closed position (shown in the figure) and an open position (not shown). In the closed position, first and second seals, preferably provided by resilient o-rings 83 and 85, provide seals between the shutter 79 and the sidewall 87 of the cylinder 63, and between a distal edge 89 of the shutter 79 and a radially extending flange 91 at the distal of the second cylinder 63. First and second pneumatic actuators 93, 95 are mechanically connected to the shutter 79 to rapidly raise and lower the shutter 79. O-ring 85 is secured to an o-ring groove 96 in flange 91 by a glue to prevent its displacement in cycling the shutter 79 open and closed.

Figure 4:
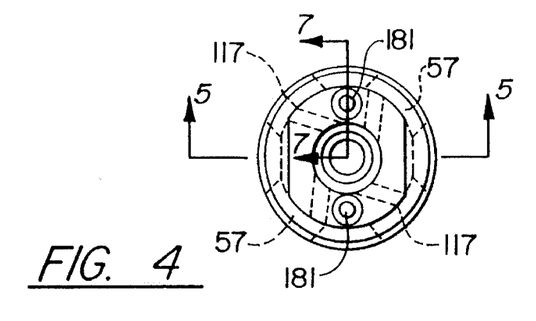
FIG. 4 is plan view of a preferred embodiment of the pneumatic cylinder.
Figure 5:
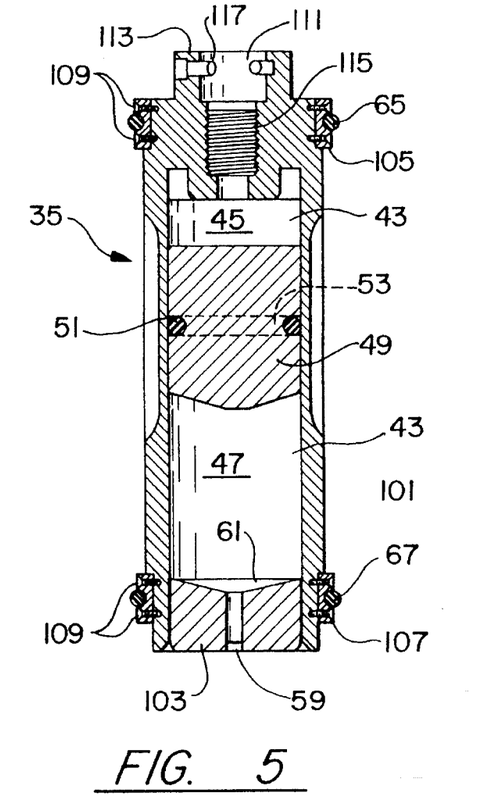
FIG. 5 is a section through line 5—5 of FIG. 4.
Figure 6:
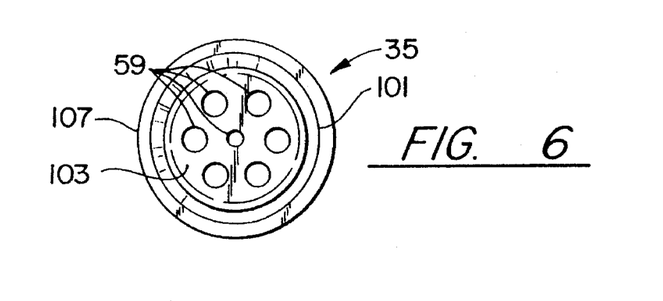
FIG. 6 is a bottom plan view of the pneumatic cylinder of FIG. 4.

Referring now to FIGS. 4 through 6, which show details of the pneumatic cylinder 35, the pneumatic cylinder includes a body 101 and an end plug 103 each fabricated from a hardened stainless steel material, and joined by, for example, a threaded connection secured with a liquid sealant, after insertion of the hammer 49. O-rings 65 and 67 are seated in annular bushings 105 and 107 respectively, that are attached to the body 101 of cylinder 35 by fasteners, such as screws 109. The upper end of the body 101 is adapted for rigidly securing a mandrel 37 for attachment to the plug 1. A central bore 111 preferably extends from a proximal face 113 into the proximal end 45 of the chamber 43. The bore 111 includes screw threads 115 along a middle portion of its length for screwing in a distal end of a mandrel. The mandrel is further secured to the pneumatic cylinder 35 by a plurality of set screws (not shown), threaded into angularly extending threaded holes 117 transverse to the mandrel.

Figure 8:
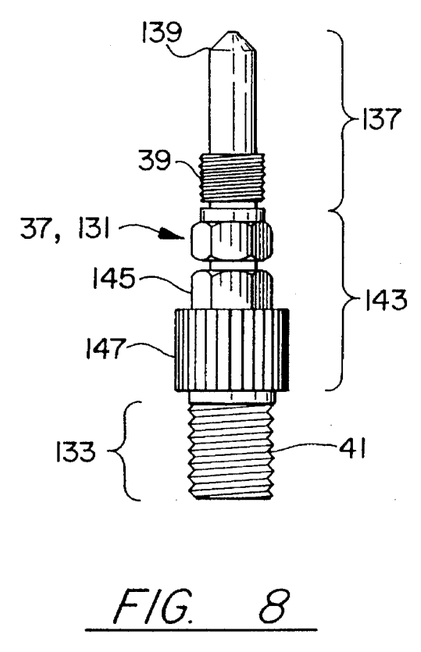
FIG. 8 is an elevation view of a preferred embodiment of a puller mandrel adapted for the pneumatic cylinder of FIG. 4.

A preferred embodiment of a mandrel 37 for pulling a plug is illustrated in FIG. 8. The puller mandrel 131 is preferably fabricated of a solid piece of stainless steel. A distal end 133 includes screw threads 41 adapted for screwing into the internal threads 115 at the proximal end of the pneumatic cylinder 35. A proximal end 137 includes a centering post 139 and external screw threads 39 for screwing into the skirt threads 15 of the plug 1. A middle section 143 is adapted, for example with flats 145, for grasping and turning with turning tools (not shown). Means resisting loosening of the mandrel 131 from the cylinder 35 are provided by angled, longitudinally extending notches 147 cooperating with set screws (not shown) threaded into the angularly extending threaded holes 117 transverse to the mandrel.

Figure 9:
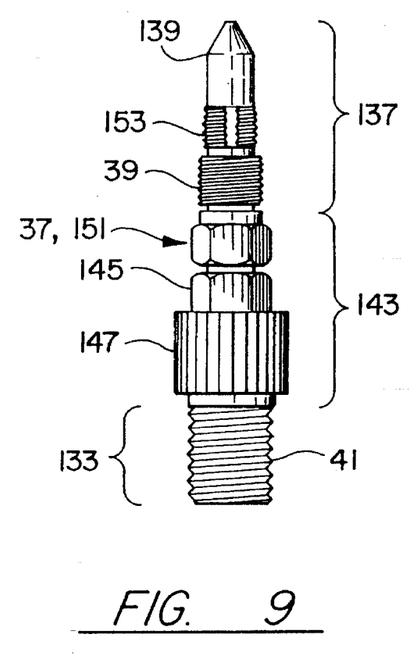
FIG. 9 is an elevation view of a second preferred embodiment of a puller mandrel including a tap.

A second embodiment of a puller mandrel 151 is illustrated in FIG. 9. Similar to the puller mandrel 131 illustrated in FIG. 8, puller mandrel 151 includes a distal section 133 that is threaded for screwing into the pneumatic cylinder 35, a middle section 143 adapted for grasping and turning with turning tools and for resisting loosening of the puller mandrel 151, and a proximal section 137 having a centering post 139 and screw threads 39 adapted for attachment to the skirt threads 15 of a plug 1. In addition, the proximal section 137 includes tap threads 153 for tapping into and further rigid attachment to the tapered inner surface 17 of a plug that is potentially cracked above the skirt threads 15.

Figure 10:
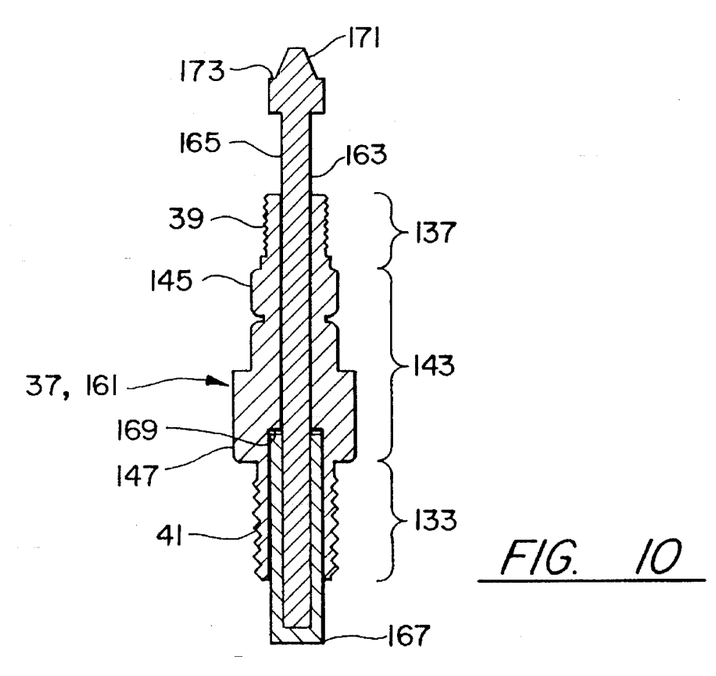
FIG. 10 is a longitudinal section view of a push-back mandrel.

A mandrel 37 adapted for disengaging the expander member 19 is illustrated in FIG. 10 in longitudinal cross-section. Push-back mandrel 161 includes a distal threaded section 133 for screwing into the pneumatic cylinder 35 and a proximal section 137 having threads 39 for screwing securely to the plug 1, and a middle section 143 having a surface adapted, for example with flats 145 for holding and grasping with a turning tool. Grooved notches 147 resist loosening of the push-back mandrel 161 from the cylinder 35. The push-back mandrel 161 also includes a central, axially extending bore 163. A push-rod 165 is slideably moveable within the bore 163 and extends beyond the proximal end 137 and distal end 133 of the push-back mandrel 161. A push-rod anvil 167 caps the distal end of the push-rod 165. An annular shoulder 169 in the bore 163 provides a stop surface of the push-rod anvil to prevent the push-rod 165 from extending too far into a plug 1. The proximal end of the push-rod includes a centering post 171 and a radially extending surface 173 for pushing against the expander member 19. Push-back mandrel 161 can be used for both pushing the expander member 19 out of position in the plug 1, and also for pulling a plug 1. However, because the push-back mandrel 161 is not a solid member and may break or deform due to the stresses applied and by the tool 31, it is generally preferable to use a solid mandrel 37, such as those illustrated in FIGS. 8 and 9 for plug pulling.

To remove a plug, a push-back mandrel 161 having a push-rod member 165 is first secured to the pneumatic cylinder 35. The tool 31 is positioned directly beneath a plug 1 using visual aids and leveling devices (not shown) and the push-back mandrel is screwed into the plug 1 by turning the pneumatic cylinder 35. At this stage the push-rod 165 is in a lowered position (see FIG. 3a) and the chamber 43 is not pressurized until the push-back mandrel 161 is rigidly secured to both the plug 1 and the pneumatic cylinder 35. With both the shutter 79 and the proximal vent mechanism 78 open, the chamber is open to ambient pressure and the hammer 49 rests against the anvil 61. Keeping the shutter 79 open, the proximal vent mechanism 78 is closed with pneumatic pressure turned on from each of the first and second sources of pressurized air 74, 76. Quickly closing the shutter 79 and opening the proximal vent mechanism 78 at the same time creates a pressure differential that provides a force to drive the hammer 49 up against the push-rod anvil 167 at speed, thereby communicating an impulsive force to the expander member 19. The cycle is repeated by first closing the proximal vent mechanism 78 while opening the shutter 79. This causes the hammer 49 to move towards the anvil 61. Another impulse is delivered by again quickly closing the shutter 79 and opening the proximal vent mechanism 78.

The pneumatic pressure from the first source of pressurized air 74 is preferably just enough to move the hammer 49 towards the anvil 61 during the recovery period of the expander push-back procedure and will generally differ for different hammer 49 and cylinder 35 designs. A typical pressure is about 15 psi. The pneumatic pressure from the second source of pressurized air 76 is typically about 15–40 psi greater than that from the first source of pressurized air 74. Thus, the displacement impulses are produced by operation of the shutter 79 and the proximal vent mechanism 78 while the first and second sources of pressurized air 74, 76 are kept open.

Figure 7:
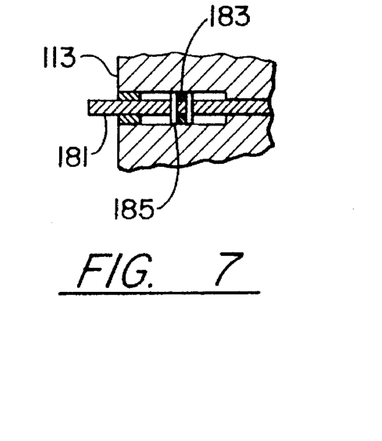
FIG. 7 is a section view through line 7—7 of FIG. 4.

Referring now also to FIG. 7, an indicator pin 181 is slideably moveable in a bore axially extending through the proximal end of pneumatic cylinder 35. O-ring 183 in o-ring groove 185 provides a pneumatic seal for pin 181. Pin 181 is used as a visual indicator when impulsively displacing the expander member 19 out of position with push-rod 165. At the start of the operation of displacing the expander member 19, the indicator pin 181 is in a lowered position having a distal end extending down into the proximal end 45 of chamber 43. If no movement of the pin 181 is seen, the pressure in the distal end 47 of the chamber 43 is increased, thereby increasing the energy of the displacement impulses, until some substantial movement is noticed. When the hammer 49 pushes the push-rod member 165 high enough to displace the expander member 19, the hammer 49 also strikes the distal end of the indicator pin 181 and moves it up as a visual indicator that the procedure is finished. The push-rod member 165 moves to a full stop position with the push-rod anvil 167 against the shoulder 169. It should be noted that during this operation the pneumatic cylinder 35 is resting against the distal of the second cylinder 63 so as not to transfer any impulsive force to the second cylinder 63.

After the expanded member is pushed out of position by the push-rod member 165, the push-back mandrel 161 is removed from the plug 1 and then removed from the pneumatic cylinder 35. A puller mandrel, such as puller mandrel 131, is then rigidly secured to the pneumatic cylinder 35 and to the plug 1 using screw threads for attachment to each. With the shutter 79 and the proximal vent mechanism 78 each in the closed position, both the proximal end 45 and the distal end 47 of the chamber 43 are pressurized. The pressure in the distal end 47 is greater than the pressure in the proximal end 45 so that the hammer 49 is raised to the proximal end of the chamber 43. While continuing to provide pneumatic pressure to both the proximal end 45 and the distal end 47 of the chamber 43, the shutter 79 is quickly opened with the pneumatic actuators 93, 95, thereby venting the distal end 47 of the chamber to channels 59 and thence 81. Since a positive pressure is maintained above the hammer 49 in the proximal end 45 of the chamber, the hammer 49 is driven against the anvil 61 at speed by the pressure head in the proximal end 45 of the chamber and by gravity. This transfers an impulsive energy via the pneumatic cylinder 35 and the puller mandrel 131 that may cause a displacement of the plug. It is important that the opening of the shutter 79 be performed quickly in order that the hammer 49 accelerate quickly.

For the plug pulling operation, the pneumatic cylinder 35 is positioned at the proximal end of the second cylinder, leaving a gap of about ½ inch between the distal plug 103 and the second cylinder 63 in order that the pulling impulses are not transferred to the second cylinder 63.

The energy of the pulling impulse will depend upon the mass of the hammer 49, its travel distance in the chamber 43 before impacting the anvil 61, the surface areas of the proximal and distal sides of the hammer 49, the rapidity of venting the distal end 47 of the chamber 43, and the pneumatic pressure in the proximal end 45 of the chamber. Typically, both the regulated supply pressure to the proximal end 45 and to the distal end 47 of the chamber 43 are varied in unison during the pulling operation, the difference between them being held constant, the distal end pressure supply being greater than that of the proximal side pressure supply. The pressure difference should be sufficient to move the hammer 49 to the proximal end 45 of the chamber 43 in a reasonable time between pulling impulses when the shutter 79 is closed, typically about 15 psi.

The impulsive energy applied to the plug should be at least sufficient to move the plug. This can only be determined in the field. Controlled laboratory tests have shown that about 30 ft-lbs of energy is sufficient to pull most plugs of the type described hereinabove. However, it is prudent to start at a significantly lower pulling impulse energy and slowly increase the energy if there is insufficient plug travel. A feedback mechanism (not shown) can be used to sense movement of the plug and adjust the pressure in the proximal end 45 of the chamber 43 to increase the impulsive energy if necessary. The process of raising the cylinder 49 and driving it against the anvil 61 is repeated until the plug is removed.

In conjunction with the impulsive pulling force provided by the hammering action of the tool 31, a static pull force can also preferably be applied to the plug 1. This can be provided most simply by the weight of the first cylinder 35 hanging from the plug 1 and by the mandrel 37. As illustrated in FIG. 3a, the second cylinder 63 is supported by the pneumatic cylinder 35 and also contributes its weight to the static pull force. A typical total weight applying the static pull force is in a range of 10–20 pounds. This is significantly less than the static pulling force applied by hydraulic plug pullers.

Whereas particular embodiments of the present invention have been described above for purposes of illustration, it will be appreciated by those skilled in the art that numerous variations of the details may be made without departing from the invention as described in the appended claims.

We claim:

1. A tool for pulling a plug from a conduit having an open end, the tool including means for applying a pulling impulse to the plug comprising:

a pneumatic cylinder, including an axially extending chamber within the cylinder having an end surface distal from the plug defining an anvil;

a hammer sealingly slidable within the chamber in response to a pressure difference between a proximal end of the chamber on one side of the hammer proximal the plug and a distal end of the chamber on an opposite side of the hammer:

connection means for providing a rigid connection between the plug and the cylinder; and pressure control means for providing a positive pressure to the proximal end of the chamber and for varying the pressure in the distal end of the chamber, such that the hammer can be alternately moved away from the anvil and driven against the anvil at speed to apply the pulling impulse to the plug, wherein the pressure control means includes:

a second cylinder substantially surrounding the pneumatic cylinder and spaced therefrom;

first and second sealing means cooperatively defining a proximal plenum proximate the proximal end of the chamber between the second cylinder and the pneumatic cylinder and a distal plenum proximate the distal end of the chamber between the second cylinder and the pneumatic cylinder;

shutter means for venting the distal plenum;

proximal pneumatic connection means for providing pressurized air to the proximal plenum from a first source of pressurized air;

distal pneumatic connection means for providing pressurized air to the distal plenum from a second source of pressurized air;

proximal channel means operatively connecting the proximal plenum to the proximal end of the chamber; and distal channel means for operatively connecting the distal plenum to the distal end of the chamber.

2. The tool of claim 1, wherein the first and second sealing means each comprise an o-ring.

3. The tool of claim 1, wherein the cylinder is supported via the connection means from the plug, whereby the weight of the cylinder applies a static pull force to the plug.

4. The tool of claim 1, wherein the connection means includes a puller mandrel having a first end adapted for removable, rigid, connection to the plug and mandrel connection means at the proximal end of the cylinder adapted for removable, rigid, connection to a second end of the puller mandrel.

\* \* \* \* \*